US011865496B2

(12) United States Patent
Hardwick (10) Patent No.: US 11,865,496 B2
(45) Date of Patent: Jan. 9, 2024

(54) MITIGATION OF MERCURY VAPOR EMISSIONS (71) Applicant: W. L. Gore & Associates, Inc., Newark, DE (US)

(72) Inventor: Steven J. Hardwick, Newark, DE (US)

(73) Assignee: W. L. Gore & Associates, Inc., Newark, DE (US)

(*) Notice: Subject to any disclaimer, the term of this patent is extended or adjusted under 35 U.S.C. 154(b) by 81 days.

(21) Appl. No.: 17/626,807

(22) PCT Filed: May 12, 2020

(86) PCT No.: PCT/US2020/032454
§ 371 (c)(1),
(2) Date: Jan. 12, 2022

(87) PCT Pub. No.: WO2020/231982
PCT Pub. Date: Nov. 19, 2020

(65) Prior Publication Data
US 2022/0314164 A1 Oct. 6, 2022

Related U.S. Application Data (60) Provisional application No. 62/846,985, filed on May 13, 2019.

(51) Int. Cl.
*B01D 53/64* (2006.01)
*B01D 53/82* (2006.01)
(Continued)

(52) U.S. Cl.
CPC ............. *B01D 53/64* (2013.01); *B01D 53/82* (2013.01); *B01J 20/20* (2013.01); *B01J 20/261* (2013.01);
(Continued)

(58) Field of Classification Search
CPC .. B01D 53/64; B01D 53/82; B01D 2251/108; B01D 2253/102; B01D 2253/25;
(Continued)

(56) References Cited

U.S. PATENT DOCUMENTS 3,578,390 A 5/1971 Kruel et al.
3,953,566 A 4/1976 Gore
(Continued)

FOREIGN PATENT DOCUMENTS

CN 104 768 630 A * 7/2015 .............. B01J 27/04
CN 105214601 A 1/2016
(Continued)

OTHER PUBLICATIONS

"Tetrabutylammonium iodide," Merck, Retrieved from https://www.sigmaaldrich.com/IN/en/product/aldrich/86890, Retrieved on Jun. 21, 2022, pp. 7.
(Continued)

*Primary Examiner* — Timothy C Vanoy (57) ABSTRACT

Some aspects of the present disclosure relate to a method comprising obtaining a sorbent polymer composite material, contacting the sorbent polymer composite material with mercury vapor to form a used sorbent polymer composite material; wherein the used sorbent polymer composite material comprises oxidized mercury and wherein the used sorbent polymer composite material emits oxidized mercury vapor; and contacting the used sorbent polymer composite material with a halogen source, so as to result in a treated sorbent polymer composite material. In some embodiments, the treated sorbent polymer composite material emits less than 0.01 µg oxidized mercury vapor per minute per gram of the treated sorbent polymer composite, compared to a used sorbent polymer composite, when measured at 65° C. in air having a relative humidity of 95%.

29 Claims, 2 Drawing Sheets (51) Int. Cl.
*B01J 20/20* (2006.01)
*B01J 20/26* (2006.01)
*F23J 15/02* (2006.01)

(52) U.S. Cl.
CPC ......... *F23J 15/02* (2013.01); *B01D 2251/108* (2013.01); *B01D 2253/102* (2013.01); *B01D 2253/25* (2013.01); *B01D 2257/602* (2013.01); *F23J 2215/60* (2013.01)

(58) Field of Classification Search
CPC ... B01D 2257/602; B01J 20/20; B01J 20/261; F23J 15/02; F23J 2215/60
See application file for complete search history.

(56) References Cited

U.S. PATENT DOCUMENTS

| | | | |
|---|---|---|---|
| 4,419,107 | A | 12/1983 | Roydhouse |
| 5,336,835 | A | 8/1994 | McNamara |
| 7,442,352 | B2 | 10/2008 | Lu et al. |
| 7,791,861 | B2 | 9/2010 | Zhong et al. |
| 2004/0074391 | A1 | 4/2004 | Durante et al. |
| 2005/0019240 | A1* | 1/2005 | Lu ................ B01J 20/027 502/402 |
| 2005/0148465 | A1 | 7/2005 | Durante et al. |
| 2009/0007785 | A1 | 1/2009 | Kimura et al. |
| 2010/0025302 | A1 | 2/2010 | Sato et al. |
| 2011/0020205 | A1 | 1/2011 | Kawamura et al. |
| 2011/0195003 | A1 | 8/2011 | Durham et al. |
| 2012/0067220 | A1 | 3/2012 | Velpari et al. |
| 2012/0308461 | A1* | 12/2012 | Mohanty ............ B01J 20/30 502/402 |
| 2014/0186243 | A1 | 7/2014 | Li et al. |
| 2014/0260976 | A1* | 9/2014 | Stark ................. B01D 47/14 95/134 |
| 2015/0147246 | A1 | 5/2015 | Li et al. |
| 2015/0190799 | A1 | 7/2015 | Kanatzidis et al. |
| 2016/0250619 | A1 | 9/2016 | Hardwick et al. |
| 2017/0100692 | A1 | 4/2017 | Olson et al. |
| 2017/0173557 | A1 | 6/2017 | Olson et al. |
| 2017/0296849 | A1 | 10/2017 | Levan, Jr. et al. |
| 2018/0257031 | A1* | 9/2018 | Olson ................ B01J 20/04 |

FOREIGN PATENT DOCUMENTS

| | | | | |
|---|---|---|---|---|
| CN | 109 224 829 A | * | 1/2019 | ............ B01D 53/64 |
| JP | H04247237 A | | 9/1992 | |
| KR | 10-2007-0089308 A | | 8/2007 | |
| WO | 95/19828 A1 | | 7/1995 | |
| WO | 2004094024 A2 | | 11/2004 | |
| WO | 2016138193 A1 | | 9/2016 | |
| WO | 2019/046882 A1 | | 3/2019 | |
| WO | WO 2019 046 882 A1 | * | 3/2019 | ............... C02F 1/28 |

OTHER PUBLICATIONS

Cotton, F. A., et al. "Mercury(II) complexes—halide and pseudo halide complexes," Advanced Inorganic Chemistry, 5th addition, 1988, pp. 612-613.

Goggin, P. L., et al., "Vibrational spectroscopic studies of tetra-n-butylammonium trihalogenomercurates; crystal structures of [NBun4](HgCl3) and [NBun4]-(HgI3)," Journal of the Chemical Society, Dalton Transactions, Issue 5, Jan. 1, 1982, pp. 875-882.

Huggins, F. E., et al., "XAFS characterization of mercury captured from combustion gases on sorbents at low temperatures," Fuel Processing Technology, vol. 82, Issues 2-3, Aug. 15, 2003, pp. 167-196.

Huggins, F. E., et al., "XAFS Examination of Mercury Sorption on Three Activated Carbons," Energy and Fuels, vol. 13, No. 1, 1999, pp. 114-121.

Hutson, N. D., et al. "XAS and XPS Characterization of Mercury Binding on Brominated Activated Carbon," Environ. Sci. Technol., vol. 41, Feb. 3, 2007, pp. 1747-1752.

International Preliminary Report on Patentability received for PCT Patent Application No. PCT/US2020/032454, dated Nov. 25, 2021, 9 pages.

International Search Report and Written Opinion received for PCT Patent Application No. PCT/US2020/032454, dated Jul. 29, 2020, 12 pages.

Mercury(II) iodide, Merk, Retrieved from https://www.sigmaaldrich.com/IN/en/product/sigald/221090, Retrieved on Jun. 21, 2022, pp. 8.

Nockemann, P., "Bis(tetrabutylammonium) decaiodo-tetramercurate(II), (Bu4N)2[Hg4I10]," Acta Crystallographica, Metal-Organic Compounds, E59, 2003, pp. m236-m238.

Sano, A., et al., "Vapor-phase elemental mercury adsorption by activated carbon co-impregnated with sulfur and chlorine," Chemical Engineering Journal, vol. 315, May 1, 2017, pp. 598-607.

Snyder, R. V., et al. "Dynamics and thermodynamics of axial ligation in metalloporphyrins. 4. Kinetics of porphyrin inversion in high-spin ferric complexes," J. Amer. Chem. Soc., vol. 98, No. 15, Jul. 1, 1976, pp. 4419-4424.

Takaoka, M., et al. "Determination of the Chemical States of Mercury on Activated Carbon Using Xanes", AIP Conference Proceeding, vol. 882, Feb. 2007, pp. 3.

* cited by examiner

MITIGATION OF MERCURY VAPOR EMISSIONS

RELATED APPLICATIONS

The present application is a national phase filing under 35 USC 371 of International Application No. PCT/US2020/032454, filed on May 12, 2020, which claims priority to U.S. Provisional Patent Application No. 62/846,985, filed on May 13, 2019, the entire contents and disclosures of which are hereby incorporated by reference.

FIELD

The field of the disclosure relates to the recovery of mercury removal efficiency and mitigation of mercury vapor emissions from a sorbent material.

BACKGROUND

Coal-fired power generation plants, municipal waste incinerators, and oil refinery plants generate large amounts of flue gases that contain substantial varieties and quantities of environmental pollutants. One such pollutant is mercury. Mercury is highly toxic and dangerous to the environment. As such, the emission of mercury is subject to stringent regulations. Improved methods of reducing mercury from flue gas streams are therefore highly desirable.

One method for removing mercury from flue gas streams involves the use of a sorbent material comprising activated carbon. Powdered activated carbon is generally injected in the flue gas stream prior to an electrostatic precipitator, or fabric filter. This method is effective but often requires very large quantities of injected carbon to achieve low mercury levels. Powdered carbon injection is costly, generates a large amount of mercury containing waste, and may limit the value of fly ash for use in cement or other applications. Fixed bed processes, which utilize carbon more effectively than powder injection are difficult to practice in these particulate laden environments due to plugging concerns. Consequently, fixed bed processes have generally been applied downstream of the flue gas desulfurization (FGD) unit. The cooled flue gas which exits the FGD is introduced into the sorbent, where the mercury vapor is absorbed and thereby removed. Thereafter, the flue gas is discharged into a stack substantially free of mercury vapor.

Sorbent Polymer Composites which utilize an activated carbon filled PTFE, containing various additives to enhance mercury capture have been proven to be particularly effective in fixed bed mercury removal applications.

One drawback of high mercury removal efficiency over a long duration of time, is the reduction of capture enhancing additives and the accumulation of oxidized mercury species. The reduction of capture enhancing agents will lead to the reduction of mercury removal efficiency while the accumulation of oxidized mercury species may lead to mercury vapor emissions. Oxidized mercury species are ubiquitous in the flue gas of coal combustion. In particular, mercuric halides, such as mercury (II) chloride, mercury (II) bromide and mercury (II) iodide have significant vapor pressure and can produce vapor emissions under certain conditions. Mercuric halides can come from combustion of coal, from the use of bromine salts in coal, and can be generated as by-products from the reaction of iodinated activated carbons with mercury. In some cases, the vapor pressure generated from the accumulation of oxidized mercury species can create vapor emissions, which reduces the effective removal efficiency and creates a practical limit on the life of the fixed bed adsorbent.

Over time, oxidized mercury species can accumulate in and on the sorbent. This accumulation of oxidized mercury species may cause vapor emissions. Mercury limits are generally set at levels below 10 µg/m³. 10 µg/m³ of mercury is roughly equivalent to 1 part per billion (ppb). Consequently, a very small amount of oxidized mercury can create measurable levels of mercury. The reduction of removal efficiency and the mercury vapor emissions may ultimately limit the ability of mercury sorbents to meet compliance targets. In this way, the accumulation of oxidized mercury can limit the life of the sorbent.

Accordingly, a method of mitigating vapor emissions of oxidized mercury from a sorbent is needed.

SUMMARY

One aspect of the present disclosure relates to a method comprising:
  obtaining sorbent polymer composite material;
    wherein the sorbent polymer composite material comprises:
      a sorbent material; and
      a polymer material;
  contacting the sorbent polymer composite material with mercury vapor to form a used sorbent polymer composite material;
    wherein the used sorbent polymer composite material comprises oxidized mercury and
    wherein the used sorbent polymer composite material emits oxidized mercury vapor;
  contacting the used sorbent polymer composite material with a halogen source, so as to result in a treated sorbent polymer composite material;
    wherein the treated sorbent polymer composite material emits 0.01 µg mercury vapor to 0.10 µg less oxidized mercury vapor per minute per gram of the treated sorbent polymer composite, compared to the used sorbent polymer composite, when measured at 65° C. in air having 95% relative humidity.

In a further aspect, the method further comprises repeating the step of contacting the used sorbent polymer composite material with the halogen source until the treated sorbent polymer composite material emits less than 0.01 µg mercury vapor per minute per gram of oxidized mercury when measured at 65° C. in air having 95% relative humidity.

In a further aspect, the used sorbent polymer composite material has a first mercury removal efficiency, wherein the treated sorbent polymer composite material has a second mercury removal efficiency, and wherein the second mercury removal efficiency is 10% to 100% greater than the first mercury removal efficiency.

In a further aspect, the step of contacting the used sorbent polymer composite material with the halogen source until the treated sorbent polymer composite material has a second mercury removal efficiency that is more than double the first mercury removal efficiency.

In a further aspect, the treated sorbent polymer composite material comprises 0.1 wt % to 10 wt % of the halogen source based on the weight of the treated sorbent polymer composite material.

In a further aspect, the method comprises contacting the used sorbent polymer composite material with the halogen source until the treated sorbent polymer composite material comprises 1 wt % to 5 wt % of the halogen source based on the weight of the treated sorbent polymer composite material.

In a further aspect, the polymer material is at least one of polytetrafluoroethylene (PTFE); polyfluoroethylene propylene (PFEP); polyperfluoroacrylate (PPFA); polyvinyllidene fluoride (PVDF); a terpolymer of tetrafluoroethylene, hexafluoropropylene and vinylidene fluoride (THV); polychlorotrifluoroethylene (PCFE), and other copolymers or terpolymers containing at least one fluoromonomer with or without additional non-fluorinated monomers.

In a further aspect, the sorbent material is an activated carbon.

In a further aspect, the halogen source is an alkali metal halide, an ammonium halide, a quaternary ammonium halide, or a combination thereof.

In a further aspect, the alkali metal halide is sodium chloride, potassium chloride, sodium bromide, potassium bromide, sodium iodide, potassium iodide, or a combination thereof.

In a further aspect, the quaternary ammonium halide is tetramethylammonium iodide, tetraethylammonium iodide, tetrapropylammonium iodide, tetrabutylammonium iodide, tetramethylammonium bromide, tetraethylammonium bromide, tetrapropylammonium bromide, tetrabutylammonium bromide, tetramethylammonium chloride, tetraethylammonium chloride, tetrapropylammonium chloride, tetrabutylammonium chloride, ammonium chloride, ammonium bromide, or a combination thereof.

In a further aspect, the step of contacting the used sorbent polymer composite material with a halogen source comprises spraying a solution comprising the halogen source on the used sorbent polymer composite material.

In a further aspect, the step of contacting the used sorbent polymer composite material with a halogen source comprises soaking the used sorbent polymer composite material in a solution comprising the halogen source.

In a further aspect, the solution comprises 0.01 wt % to 10 wt % of the halogen source based on the weight of the sorbent polymer composite material or the spent sorbent polymer composite material.

In a further aspect, the solution is an aqueous solution.

In a further aspect, the solution is a non-aqueous solution.

In a further aspect, the non-aqueous solution comprises alcohol.

In a further aspect, the alcohol comprises one or more of methanol, ethanol, or isopropanol.

In a further aspect, the solution further comprises a surfactant.

In a further aspect, the solution comprises 0.001 wt % to 0.1 wt % of the surfactant based on the weight of the solution.

In a further aspect, the surfactant is a non-ionic surfactant.

In a further aspect, wherein the solution comprises a co-solvent.

In a further aspect, the solution comprises 10 wt % to 50 wt % of the co-solvent based on the weight of the solution.

In a further aspect, the oxidized mercury comprises mercury halides.

In a further aspect, the treated sorbent polymer composite material comprises complexes of: (i) oxidized mercury and ii) the halogen source.

Another aspect of the present disclosure relates to a treated sorbent polymer composite material comprising:
a sorbent material;
a polymer material; and a
a chemical complex comprising:

oxidized mercury; and
a halogen source;
wherein the treated sorbent polymer composite material emits 0.01 µg mercury vapor to 0.10 µg less oxidized mercury vapor per minute per gram of the treated sorbent polymer composite, compared to a used sorbent polymer composite, when measured at 65° C. in air having 95% relative humidity;
wherein the used sorbent polymer composite is identical to the treated sorbent polymer composite except that:
the used sorbent polymer composite does not include a halogen source; and
the oxidized mercury of the used sorbent polymer composite is not present in a complex with a halogen source.

In a further aspect, the chemical complex has the formula $HgX_4^{2-}$, wherein X is chloride ($Cl^-$), bromide ($Br^-$), or iodide ($I^-$).

In a further aspect, the chemical complex has the formula $HgX_3^-$, wherein X is chloride ($Cl^-$), bromide ($Br^-$), or iodide ($I^-$).

In a further aspect the chemical complex is integrated into a matrix of the treated sorbent polymer composite.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the disclosure may be readily combined, without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, a sorbent polymer composite material is obtained. As used herein "sorbent polymer composite material" is defined as a sorbent material embedded within a matrix of a polymer material.

In some embodiments, the sorbent polymer composite material is contacted with mercury vapor, thereby resulting in a used sorbent polymer composite material. As used herein, a "used sorbent polymer composite" is a sorbent polymer composite that has been contacted with mercury vapor until the sorbent polymer composite emits mercury vapor at an emission rate of at least 0.01 µg mercury vapor per minute per gram of the sorbent polymer composite when measured at 65° C. in air having 95% relative humidity. In some embodiments, a "used sorbent polymer composite" is a sorbent polymer composite that has been contacted with a flue gas stream that includes mercury vapor until the sorbent polymer composite emits mercury vapor at an emission rate of at least 0.01 µg mercury vapor per minute per gram of the sorbent polymer composite when measured at 65° C. in air having 95% relative humidity. In some embodiments, the flue gas stream may include additional components, such as but not limited to $SO_x$ and $NO_x$ compounds. In some embodiments, the mercury vapor in the flue gas stream comprises oxidized mercury, elemental mercury, or any combination thereof. In some embodiments, a used sorbent polymer composite can be formed in a commercial scale process. In some embodiments, a used sorbent polymer composite can be created under laboratory conditions.

In some embodiments, emission rate can be converted into an emission concentration, as described herein, infra. In some embodiments, the emission rate of the used sorbent polymer composite corresponds to an emission concentration of at least 1 µg/m³ when measured at 65° C. in air having 95% relative humidity. In some embodiments, the emission rate of the used sorbent polymer composite corresponds to an emission concentration of at least 5 µg/m³ when measured at 65° C. in air having 95% relative humidity. In some embodiments, the emission rate of the used sorbent polymer composite corresponds to an emission concentration of at least 10 µg/m³ when measured at 65° C. in air having 95% relative humidity. In some embodiments, the emission rate of the used sorbent polymer composite corresponds to an emission concentration of 1 µg/m³ to 10 µg/m³ when measured at 65° C. in air having 95% relative humidity. In some embodiments, the emission rate of the used sorbent polymer composite corresponds to an emission concentration of 5 µg/m³ to 10 µg/m³ when measured at 65° C. in air having 95% relative humidity.

In some embodiments, the used sorbent polymer composite material comprises oxidized mercury and emits oxidized mercury vapor, which may comprise at least one mercuric halide such as, but not limited to, $HgCl_2$, $HgBr_2$, $HgI_2$, or any combination thereof. The used sorbent polymer composite material is contacted with a halogen source to form a treated sorbent polymer composite material.

As used herein, a "treated sorbent polymer composite" is defined as a sorbent polymer composite material that, at one point, was a "used sorbent polymer material," as defined herein, and was then contacted with the halogen source until the sorbent polymer material emits mercury vapor at an emission rate of less than 0.01 µg mercury vapor per minute per gram of the sorbent polymer composite when measured at 65° C. in air having 95% relative humidity.

In some embodiments, the used sorbent polymer composite material is repeatedly contacted with a halogen source until the treated sorbent polymer composite material emits mercury vapor at an emission rate of less than 0.01 µg mercury vapor per minute per gram of the sorbent polymer composite when measured at 65° C. in air having 95% relative humidity. In some embodiments, repeat contact with the halogen source occurs until the treated sorbent polymer composite material emits mercury vapor at an emission rate of less than 0.005 µg mercury vapor per minute per gram of the sorbent polymer composite when measured at 65° C. in air having 95% relative humidity. In some embodiments, repeat contact with the halogen source occurs until the treated sorbent polymer composite material emits mercury vapor at an emission rate of less than 0.001 µg mercury vapor per minute per gram of the sorbent polymer composite when measured at 65° C. in air having 95% relative humidity.

In some embodiments repeat contact with the halogen source occurs until the treated sorbent polymer composite material emits mercury vapor at an emission rate of 0.001 µg to 0.01 µg mercury vapor per minute per gram of the sorbent polymer composite when measured at 65° C. in air having 95% relative humidity. In some embodiments repeat contact with the halogen source occurs until the treated sorbent polymer composite material emits mercury vapor at an emission rate of 0.001 µg to 0.005 µg mercury vapor per minute per gram of the sorbent polymer composite when measured at 65° C. in air having 95% relative humidity. In some embodiments, repeat contact with the halogen source occurs until the treated sorbent polymer composite material emits mercury vapor at an emission rate of 0.005 µg to 0.01 µg mercury vapor per minute per gram of the sorbent polymer composite when measured at 65° C. in air having 95% relative humidity.

In some embodiments, the used sorbent polymer composite material has a first mercury removal efficiency and the treated sorbent polymer composite material has a second mercury removal efficiency. In some embodiments, the second mercury removal efficiency is greater than the first mercury removal efficiency.

In some embodiments, the used sorbent polymer composite material is repeatedly contacted with a halogen source until the treated sorbent polymer composite material has a second mercury removal efficiency that is 10% to 50% greater than the first mercury removal efficiency. In some embodiments, the used sorbent polymer composite material is repeatedly contacted with a halogen source until the treated sorbent polymer composite material has a second mercury removal efficiency that is 20% to 40% greater than the first mercury removal efficiency. In some embodiments, the used sorbent polymer composite material is repeatedly contacted with a halogen source until the treated sorbent polymer composite material has a second mercury removal efficiency that is 25% to 35% greater than the first mercury removal efficiency.

In some embodiments, repeat contact with the halogen source occurs until the treated sorbent polymer composite material has a second mercury removal efficiency that is 50% to 100% greater than the first mercury removal efficiency. In some embodiments, repeat contact with the halogen source occurs until the treated sorbent polymer composite material has a second mercury removal efficiency that is 60% to 90% greater than the first mercury removal efficiency. In some embodiments, repeat contact with the halogen source occurs until the treated sorbent polymer composite material has a second mercury removal efficiency that is 70% to 80% greater than the first mercury removal efficiency.

In some embodiments, the repeat contact occurs until the treated sorbent polymer composite material has a second mercury removal efficiency that is more than 100% greater than the first mercury removal efficiency. In some embodiments, the repeat contact occurs until the treated sorbent polymer composite material has a second mercury removal efficiency that is 200% 500% greater than the first mercury removal efficiency. In some embodiments, the repeat contact occurs until the treated sorbent polymer composite material has a second mercury removal efficiency that is 500% greater than the first mercury removal efficiency.

In some embodiments, the used sorbent polymer composite material is contacted with a halogen source to form a treated sorbent polymer composite material and the treated sorbent polymer composite material comprises 0.1% to 10% of the halogen source. In some embodiments, the used sorbent polymer composite material is contacted with a halogen source to form a treated sorbent polymer composite material and the treated sorbent polymer composite material comprises 0.5% to 5% of the halogen source. In some embodiments, the used sorbent polymer composite material is contacted with a halogen source to form a treated sorbent polymer composite material and the treated sorbent polymer composite material comprises 1% to 2% of the halogen source.

In some embodiments, the sorbent polymer composite material is repeatedly contacted with a halogen source until the treated sorbent polymer composite material comprises 0.1% to 1.0% of the halogen source. In some embodiments, repeat contact with the halogen source occurs until the treated sorbent polymer composite material comprises 0.2% to 0.8% of the halogen source. In some embodiments, repeat contact with the halogen source occurs until the treated sorbent polymer composite material comprises 0.4% to 0.5% of the halogen source.

In some embodiments, repeat contact with the halogen source occurs until the treated sorbent polymer composite material comprises 1% to 10% of the halogen source. In some embodiments, repeat contact with the halogen source occurs until the treated sorbent polymer composite material comprises 2% to 8% of the halogen source. In some embodiments, repeat contact with the halogen source occurs until the treated sorbent polymer composite material comprises 4% to 5% of the halogen source.

In some embodiments, the polymer material of the sorbent polymer composite material can include one or more homopolymers, copolymers or terpolymers containing at least one fluoromonomer with or without additional non-fluorinated monomers.

In some embodiments, the polymer material of the sorbent polymer composite material can include at least one of: polyfluoroethylene propylene (PFEP); polyperfluoroacrylate (PPFA); polyvinyl-lidene fluoride (PVDF); a terpolymer of tetrafluoroethylene, hexafluoropropylene or vinylidene fluoride (THV); polychlorotrifluoro ethylene (PCFE).

In some embodiments, the polymer material of the sorbent polymer composite material can include polytetrafluoroethylene (PTFE). In some embodiments, the polymer material of the sorbent polymer composite material can include expanded polytetrafluoroethylene (ePTFE).

In some embodiments, the sorbent material of the sorbent polymer composite material contains activated carbon. In some embodiments, the activated carbon material can be derived from one or more of coal, lignite, wood, coconut shells or another carbonaceous material. In some embodiments, the sorbent material can include silica gel or a zeolite.

In some embodiments, the halogen source used to treat the used sorbent polymer composite material includes one or more of an alkali metal halide, an ammonium halide, or a quaternary ammonium halide. The alkali metal halide can include one or more of sodium chloride, potassium chloride, sodium bromide, potassium bromide, sodium iodide, or potassium iodide. The quaternary ammonium halide can include one or more of tetramethylammonium iodide, tetraethylammonium iodide, tetrapropylammonium iodide, tetrabutylammonium iodide, tetramethylammonium bromide, tetraethylammonium bromide, tetrapropylammonium bromide, or tetrabutylammonium bromide, tetramethylammonium chloride, tetraethylammonium chloride, tetrapropylammonium chloride, tetrabutylammonium chloride, ammonium chloride, ammonium bromide, or any combination thereof. In some embodiments, the halide comprises iodine.

In some embodiments, the addition of a halogen source—such as a halogen salt that complexes with oxidized mercury—can mitigate vapor emissions from a used sorbent material by reducing the vapor pressure of oxidized mercury.

In some embodiments, the oxidized mercury comprises one or more mercury halides. In some embodiments, the mercury halide is a mercuric halide. In some embodiments, the mercuric halide includes one or more of a mercury (II) chloride, mercury (II) bromide or mercury (II) iodide. In some embodiments, the mercury halide is a mercurous halide. In some embodiments, the mercurous halide includes one or more of a mercury (I) chloride, mercury (I) bromide or mercury (I) iodide.

In some embodiments, the treated sorbent polymer composite material comprises complexes of oxidized mercury and the halogen source.

In some embodiments, the complexing of oxidized mercury can occur through one or both of the following reactions: (1) $AX + HgX_2 \rightarrow AHgX_3$ and (2) $AX + AHgX_3 \rightarrow A_2HgX_4$, where A is one or more of an alkali metal, an ammonium cation, or a quaternary ammonium cation and X is a halide.

In some embodiments, the treated sorbent polymer composite material can be formed by spraying a solution comprising the halogen source on the sorbent polymer composite material or the used sorbent polymer composite material. In some embodiments, the treated sorbent polymer composite material can be formed by soaking the sorbent polymer composite material or the used sorbent polymer composite material in a solution with the halogen source. In some embodiments, the solution can comprise 0.01 wt % to 0.1 wt % of the halogen source, 0.1 wt % to 1 wt % of the halogen source, or 1 wt % to 10 wt % of the halogen source. In some embodiments, the solution can comprise 0.03 wt % to 0.06 wt % of the halogen source, 0.3 wt % to 0.6 wt % of the halogen source, or 3 wt % to 6 wt % of the halogen source. In some embodiments, the solution can comprise 0.04 wt % to 0.05 wt % of the halogen source, 0.4 wt % to 0.5 wt % of the halogen source, or 4 wt % to 5 wt % of the halogen source.

In some embodiments, the solution can be aqueous or non-aqueous. In some embodiments, the solution can comprise one or more co-solvents. In some embodiments, the solution can comprise 0.01 wt % to 1 wt % of the one or more co-solvents, 1 wt % to 10 wt % of the one or more co-solvents, or 10 wt % to 50 wt % of the one or more co-solvents. In some embodiments, the solution can comprise 0.05 wt % to 0.5 wt % of the one or more co-solvents, 2 wt % to 5 wt % of the one or more co-solvents, or 20 wt % to 50 wt % of the one or more co-solvents. In some embodiments, the solution can comprise 0.03 wt % to 0.25 wt % of the one or more co-solvents, 3 wt % to 4 wt % of the one or more co-solvents, or 30 wt % to 40 wt % of the one or more co-solvents. In some embodiments, the solvent or co-solvent comprises one or more alcohols such as methanol, ethanol or isopropanol. In some embodiments, there are no co-solvents.

In some embodiments, the solution used to form the treated sorbent polymer composite material can include one or more surfactants. In embodiments where the one or more surfactants are present, the solution can comprise a sufficient amount of surfactant to ensure the critical micelle concentration is achieved. The critical micelle concentration is the concentration at which further addition of surfactant results in no further reduction in the surface tension of the solution. In some embodiments, the solution can comprise, 0.001 wt % to 0.01 wt % of the one or more surfactants or 0.01 wt % to 0.1 wt % of the surfactant. In some embodiments, the solution can comprise, 0.005 wt % to 0.05 wt % of the one or more surfactants or 0.05 wt % to 0.5 wt % of the one or more surfactants. In some embodiments, the solution can comprise, 0.0075 wt % to 0.075 wt % of the one or more surfactants or 0.075 wt % to 0.75 wt % of the surfactant. In some embodiments, the one or more surfactants is one or more of a cationic, anionic, zwitterionic, or a nonionic surfactant. In some embodiments, the one or more surfactants is a non-ionic surfactant.

In some embodiments, the one or more surfactants can provide a surface tension of 1 to 30 dynes per centimeter. In some embodiments, the one or more surfactants can provide a surface tension of 5 to 20 dynes per centimeter. In some embodiments, the one or more surfactants can provide a surface tension of 10 to 15 dynes per centimeter.

In some embodiments, the one or more nonionic surfactants can comprise at least one of: secondary alcohol ethoxylates (e.g., DOW TERGITOL™ 15-S surfactants), ethylene oxide-propylene oxide copolymers (e.g. DOW TERGITOL™ L surfactants), octylphenol ethoxylates (e.g., DOW TRITON X line of surfactants), sorbitan monolaurate (e.g., CRODA SPAN™ 20) or laurel amine oxide (e.g., STEPAN AMONYX® LO).

In some embodiments, the one or more cationic surfactants can comprise one or more long chain quaternary amines, (e.g., cetyltrimethylammonium bromide (CTAB)).

In some embodiments, the one or more anionic surfactants can comprise one or more perfluoroalkyl sulfonates (e.g. Perfluorooctylsulfonate, PFOS).

Test Methods

Exemplary tests for mercury vapor removal were performed using an apparatus including (1) a supply of air regulated by a mass flow controller (2) a mercury source produced by means a small nitrogen purge through of a DYNACALIBRATOR Calibration Gas Generators (VICI Metronics, Inc., Poulsbo, WA, USA), comprising a mercury permeation tube (3) a sample cell fitted with a bypass, and located in an oven maintained at 65° C. and (4) a stannous chloride/$H_2SO_4$ bubbler to convert any oxidized mercury to elemental mercury and (5) mercury detection by means of an RA915+ Mercury Analyzer (OHIO LUMEX Co., Inc., OH, USA), equipped with a short path length gas cell.

Mercury remediation efficiency ($\eta$) is reported as the difference between inlet mercury levels (bypassing the sample) and outlet levels (passing through the sample) divided by the inlet concentration.

$$\eta=(\text{Inlet concentration}-\text{outlet concentration})/(\text{inlet concentration})$$

Mercury Emission Test Procedure

Weighed samples (typically 10 mm×150 mm) were tested for oxidized mercury emissions in a 1 cm by 1 cm square glass contained in an oven maintained at 65° C. The sample was exposed to flowing mercury-free air, controlled by a mass flow controller. The air stream was nearly saturated with humidity by means of membrane-based permeation device (Permapure) located upstream of the sample. Total flow rates of 1-10 slpm (standard liters per minute) were employed, depending on the sensitivity required. Air exiting the sample was passed through a tin(II)chloride/sulfuric acid trap to convert oxidized mercury to elemental mercury. A heated PFA sample line was used between the oven and the tin(II)chloride/sulfuric acid trap to prevent condensation of mercuric halides. Outlet mercury concentration, was measured by an RA915+ Mercury Analyzer (OHIO LUMEX) using a short path-length cell. Emission rates were calculated based on the following equation.

$$\text{Emission Rate (µg Hg/min/g)}=(\text{flow rate (L/min)}*(1\ m^3/1000\ L)*(\text{Hg concentration}*(\mu g/Nm^3)*(1/\text{sample weight (g)}))$$

Example 1

Four samples ("Samples 1-4") each originally comprised of a sorbent Polymer Composite ("SPC") that was prepared using the general dry blending methodology taught in U.S. Pat. No. 7,791,861 to form composite samples that were then uniaxially expanded according to the teachings of U.S. Pat. No. 3,953,566 to Gore containing oxidized mercury, were recovered after several years of field exposure in the flue gas of a coal fired power plant. The four samples of used SPC were each in the form of a 10×150 mm piece and weighed approximately 1 gram each.

Samples 1-4, comprised of 50 parts activated carbon, 39 parts PTFE and 6 parts of a halogen source in the form of TBAI, were treated with an aqueous solution of containing 75 g/L potassium chloride. The potassium chloride was applied by spraying Samples 1 and 2 on each side, immersing Sample 3 twice, and by soaking Sample 4 for thirty minutes. As a result of the treatment samples 1 to 4 were changed to a treated SPC material Samples 5 and 6 were in the form of 10×150 mm pieces of the same used SPC material as described for the samples 1 to 4 (~1 gram each), obtained from the same field exposed sorbent polymer composite as described in samples 1-4. The used SPC material, containing oxidized mercury, were tested without any treatment by potassium chloride solution. They were treated only by soaking in deionized water for 30 minutes.

A summary table of the treatment applied to each sample is shown below:

TABLE 1

| Sample No. | Treatment |
| --- | --- |
| 1 | Potassium Chloride (sprayed) |
| 2 | Potassium Chloride (sprayed) |
| 3 | Potassium Chloride (immersed twice) |
| 4 | Potassium Chloride (soaked 30 minutes) |
| 5 (comparative) | Deionized Water (soaked 30 minutes) |
| 6 (comparative) | Deionized Water (soaked 30 minutes) |

The samples were placed in a 10 mm×10 mm square glass chamber, in an oven at 65° C. The sample purged with air at a rate of approximately 10 standard liters/min. Oxidized mercury vapor emission levels of the samples were measured using an RA915+ mercury analyzer (Ohio Lumex). In order to convert oxidized mercury to elemental form for detection by the mercury analyzer, the air was passed through a $SnCl_2/H_2SO_4$ bubbler prior to entering the mercury analyzer. The release rate was calculated by the following formula.

Release Rate (μg Hg/min/g)=(flow rate (L/min)*(1 m$^3$/1000 L)*(Hg concentration*(μg/Nm3)*(1/sample weight (g))

The results are tabulated below:

TABLE 2

| Sample No. | Initial concentration of oxidized mercury vapor (μg/m$^3$) of the used SPC | Final concentration of oxidized mercury vapor (μg/m$^3$) of the treated SPC | Release Rate before treatment (μg Hg vapor/min/g SPC) | Release Rate after treatment (μg Hg vapor/min/g SPC) |
| --- | --- | --- | --- | --- |
| 1-4 (potassium chloride) | ≈2-3 | <1 | 0.02-0.03 | <0.01 |
| Samples 5-6 (deionized water, comparative) | ≈2-3 | 1.8-2 | 0.02-0.03 | 0.018-0.02 |

As shown, prior to treatment with the halogen source, all of the samples exhibited emissions in excess of 0.01 μg Hg vapor/min/g SPC.

However, following treatment with the halogen source (potassium chloride solution), Samples 1-4, emitted less than 0.01 μg Hg vapor/min/g.

However, Samples 5 and 6, which were not treated with a potassium chloride solution but were instead soaked in deionized water, emitted concentration was 1.8 to 2.0 μg of oxidized mercury vapor emitted per cubic meter of sample—an average emission reduction of approximately 0.5 μg per cubic meter. The corresponding emission rate of from samples 5 and 6 were 0.018-0.020.

In sum, Example 1 illustrates that treatment of a used sorbent polymer composite containing oxidized mercury with a halogen source (e.g., an alkali metal halide salt in the form of a potassium chloride solution) is demonstrably superior to treatment of the same sorbent polymer composite with deionized water.

Example 2

The present example describes a mercury removal efficiency test of two of the samples (i.e., Samples 1 and 2) from Example 1.

Sample 1 from Example 1 was purged with air at a rate of approximately 10 standard liters/min. The test temperature was 65° C. To measure the removal efficiency of Sample 1, mercury vapor was introduced using a heated permeation device (VICI Metronics). The mercury vapor containing air was humidified to near saturation.

An RA915+ mercury analyzer (Ohio Lumex) equipped with a short path length optical cell was used to measure mercury removal efficiency.

A 10% tin(II) chloride solution in 10% sulfuric acid was used to treat the air effluent of Sample 1, ensuring that the oxidized mercury was detected by the analyzer.

Sample 1 was tested for mercury removal efficiency.

Sample 1 was then sprayed on each side with deionized water and re-tested for mercury removal efficiency.

Sample 1 was then treated with 5.5 ml of a 1 Molar potassium chloride solution on each side and re-tested again for mercury removal efficiency.

Sample 2 from example 1 was treated with 5.5 ml of a 75 g/L aqueous potassium chloride solution on each side and tested for efficiency using the same procedure outlined above.

A summary table of the treatment applied to each sample is shown below:

TABLE 3

| Sample No. | Treatment |
| --- | --- |
| 1 (comparative) | None |
| 1 (comparative) | Deionized Water |
| 1 | Potassium Chloride |
| 2 | Potassium Chloride |

The results of the efficiency measurements are tabulated below:

TABLE 4

| Sample No. | Mercury Removal Efficiency |
| --- | --- |
| 1 (untreated, comparative) | 15.1% |
| 1 (deionized water, comparative) | 17.0% |
| 1 (potassium chloride) | 21.0% |
| 2 (potassium chloride) | 23.0% |

As shown, untreated Sample 1 exhibited a first mercury removal efficiency of 15.1%. When treated with deionized water, Sample 1 exhibited a mercury removal efficiency of 17.0%. By contrast, when treated with potassium chloride, Sample 1 exhibited a second mercury removal efficiency of 21.0%. Therefore, the second mercury removal efficiency is about 45% higher than the first mercury removal efficiency.

Similarly, a second sample, Sample 2, which was taken from the same material as Sample 1, exhibited a mercury removal efficiency of 23.0% after treatment with potassium chloride.

In sum, Example 2 illustrates that used exposed sorbent polymer composites containing oxidized mercury can be treated with a halogen source of potassium chloride solution (alkali metal halide salt) to achieve a mercury removal efficiency (second mercury removal efficiency) that is demonstrably higher than the mercury removal efficiency of an untreated sorbent polymer composite (first mercury removal efficiency) and also demonstrably higher than the removal efficiency of a sorbent polymer composite treated with deionized water.

Example 3

Five samples were cut from a Sorbent Polymer Composite (SPC) that was prepared using the general dry blending methodology taught in U.S. Pat. No. 7,791,861 to form composite samples that were then uniaxially expanded according to the teachings of U.S. Pat. No. 3,953,566 to Gore and were recovered after several years of field exposure in the flue gas of a coal fired power plant containing oxidized mercury from the process. Samples 1-5 were in the form of a 10×150 mm used SPC material piece, each weighing ~1 gram.

Samples 1-5, comprised of 50 parts activated carbon, 39 parts PTFE and 6 parts of a halogen source in the form of TBAI, were purged with air at a rate of approximately 10 standard liters/min. The test temperature was 65° C. Mercury vapor was introduced by means of a heated permeation device (VICI Metronics). The mercury vapor containing air was humidified to near saturation.

An RA915+ mercury analyzer (Ohio Lumex) equipped with a short path length optical cell was used to measure mercury removal efficiency.

10% tin (II) chloride solution in 10% sulfuric acid was used to treat the air effluent of the sample, ensuring that the oxidized mercury was detected by the analyzer.

Two of the samples (Samples 1-2) were tested for mercury removal efficiency without treatment.

Two of the samples (Samples 3-4) were soaked in an aqueous solution containing 10 ppm of NALSPERSE 73551 surfactant manufactured by NALCO® and tested for mercury removal efficiency.

One of the samples (Sample 5) was treated with 10 ppm of the same surfactant. However, for Sample 5, 0.05 g of tetrabutylammonium iodide (TBAI) from Sigma Aldrich as a halogen source was added to the surfactant solution. Sample 5 was also tested for mercury removal efficiency.

A summary table of the treatment applied to each sample is shown below:

TABLE 5

| Sample No. | Treatment |
| --- | --- |
| 1 (comparative) | None |
| 2 (comparative) | None |
| 3 (comparative) | Surfactant |
| 4 (comparative) | Surfactant |
| 5 | Surfactant + TBAI |

Figure 1:
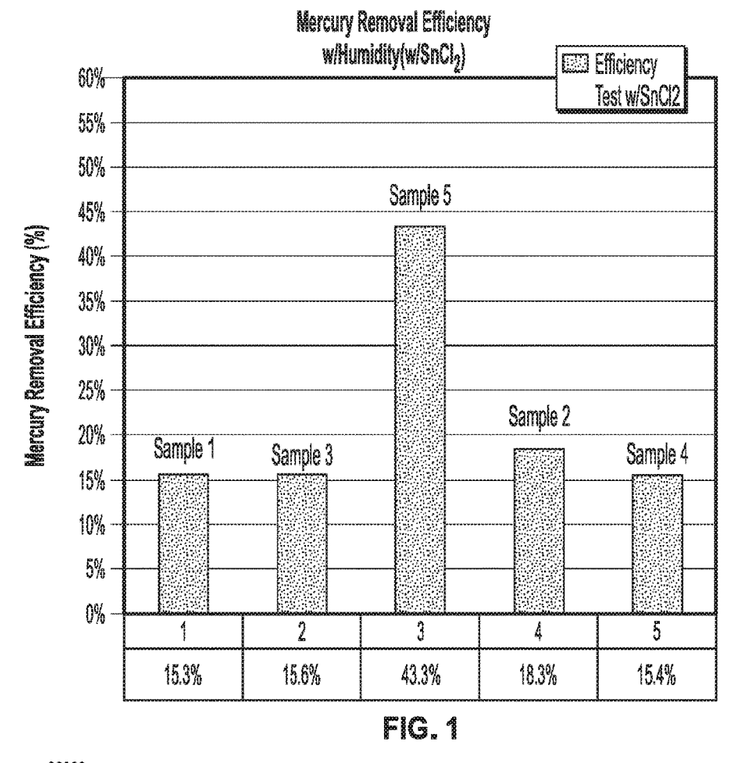
FIG. 1 depicts the effect of a halogen source of the present disclosure on the removal efficiency of oxidized mercury from a sorbent polymer composite.

The removal efficiencies of the tested samples are shown in FIG. 1 and tabulated below:

TABLE 6

| Sample No. | Mercury Removal Efficiency |
| --- | --- |
| 1 (untreated, comparative) | 15.3% |
| 2 (untreated, comparative) | 18.3% |
| 3 (surfactant only, comparative) | 15.6% |
| 4 (surfactant only, comparative) | 15.4% |
| 5 (surfactant + TBAI) | 43.3% |

As tabulated above and shown in FIG. 1, the treatment of a used sorbent polymer composite with an aqueous solution of a surfactant and a halogen source in the form of TBAI provides a mercury removal efficiency that is nearly three times higher when compared to both: (i) an untreated sorbent polymer composite and (ii) a sorbent polymer composite treated with an aqueous surfactant solution, but not a halogen source.

Example 4

The procedure outlined in Example 3 was repeated with Samples 1-5 being prepared in the same manner. However, rather than measuring mercury removal efficiency, the effect of a halogen source on mercury vapor emissions was measured. The emission rates were estimated by simple comparison of the initial mercury vapor concentration at the start of the test minus the mercury vapor concentration after 30 minutes of testing.

The rates of mercury vapor emissions for Samples 1-5 over the duration of the test are tabulated below.

TABLE 7

| Sample No. | Initial concentration of mercury vapor ($\mu g/m^3$) | Final concentration of mercury vapor ($\mu g/m^3$) | Change in mercury vapor concentration ($\mu g/m^3$) | Emission Rate ($\mu g$ Hg vapor/ min/g SPC) |
| --- | --- | --- | --- | --- |
| 1 (untreated, comparative) | ≈43 | ≈48 | ≈+5 | 0.05 |
| 2 (untreated, comparative) | ≈42 | ≈47 | ≈+5 | 0.05 |
| 3 (surfactant only, comparative) | ≈45 | ≈50 | ≈+5 | 0.05 |
| 4 (surfactant only, comparative) | ≈47 | ≈50 | ≈+3 | 0.03 |
| 5 (surfactant + TBAI) | ≈40 | ≈32 | ≈−8 | None Detected |

As shown, Samples 1-2, which were untreated, exhibited mercury emissions of approximately a 0.05 µg Hg vapor/min/g SPC over the course of the test. This indicates that during the test, the sorbent polymer composite was contaminated with oxidized mercury, which limited the efficiency that could be achieved.

Likewise, Samples 3-4, which were treated with just a surfactant solution—and not a halogen source—exhibited approximately a 0.03-0.05 µg Hg/min/g release rate over the course of the test. This also indicates that for Samples 3-4, during the test, the sorbent polymer composite was contaminated with oxidized mercury, which limits the efficiency that can be achieved.

In sharp contrast, Sample 5, which was treated with a halogen source (e.g., TBAI) and a surfactant exhibited an increase in mercury efficiency over the course of the 30 minute test. This indicates that for Sample 5, during the test, the sorbent polymer composite became more effective at preventing mercury vapor emissions over time and was not limited in performance by emission of adventitious oxidized mercury.

Example 5

Preparation of a Used Sorbent Polymer Composite Containing Oxidized Mercury

A used sorbent polymer composite was created under laboratory conditions comprised of 80 parts activated carbon and 20 parts PTFE ("a sorbent polymer composite") and was prepared using the general dry blending methodology taught in U.S. Pat. No. 7,791,861 to form composite samples that were then uniaxially expanded according to the teachings of U.S. Pat. No. 3,953,566 to Gore. 5.5 grams of this sample was treated overnight with 50 g of methanol (Sigma-Aldrich) solution containing 0.1 g $HgI_2$ (Sigma-Aldrich) ("oxidized mercury"). The sample was air dried. A portion of the treated sample was analyzed by X-ray Fluorescence ("XRF") and shown to have approximately 1 wt % Hg.

Example 6

Figure 2:
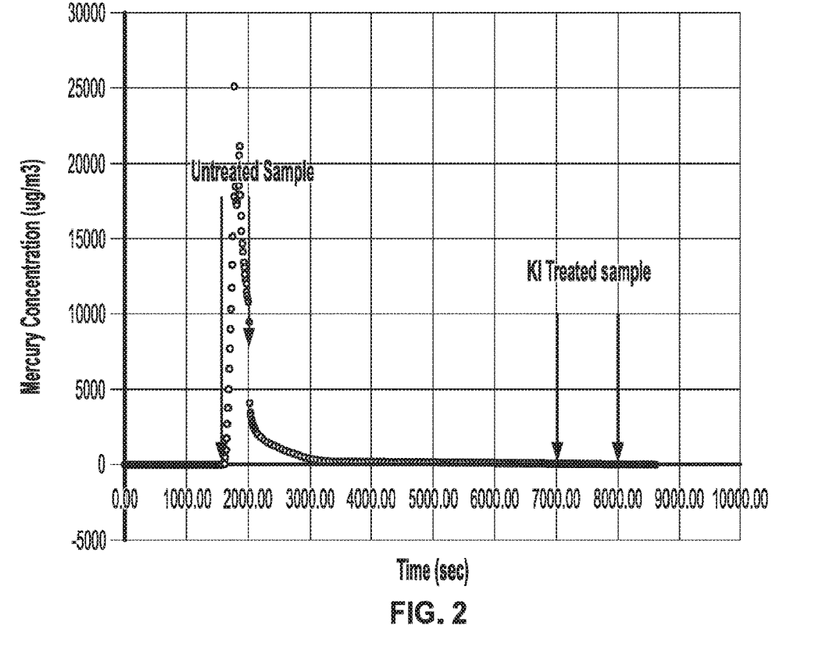
FIG. 2 depicts mercury emissions from a sorbent polymer composite before and after treatment with an exemplary halogen source.

A 10 mm×150 mm strip (0.79 g) was cut from the HgI$_2$ treated sample from Example 5. The sample was placed in a 1 cm×1 cm square sample holder at 60° C. A stable baseline was established bypassing the sample with 1 standard liter per minute of air, which was humidified to >80%. The effluent was passed through a SnCl$_2$/sulfuric acid trap chilled to 0° C. and then to the mercury analyzer (Ohio Lumex) The humid air was then directed through the sample. At this point, a very large emission (approximately 25,000 μg/m$^3$) of mercury was observed, as shown in FIG. 2. When the sample was again bypassed, the mercury level eventually returned to baseline. This large mercury emission is attributed to the vapor pressure of mercuric iodide above the sample.

The sample was removed from the holder, and soaked in a halogen source of a 2 wt % solution of KI in methanol for 15 minutes. The sample was then air dried and returned to the sample holder. When air was diverted through the sample no mercury emission was detected. This showed that treatment with potassium iodide effectively mitigated any emission of mercury vapor. Following the test, the sample was again tested for HgI$_2$ content by X-ray Fluorescence (and found to contain ~1 wt % Hg showing that no significant amount of HgI$_2$ was lost from the sample due to soaking. The sensitivity of this test, run at 1 slpm, is <0.0013 μg Hg vapor/min/g sample.

Example 7

Figure 3:
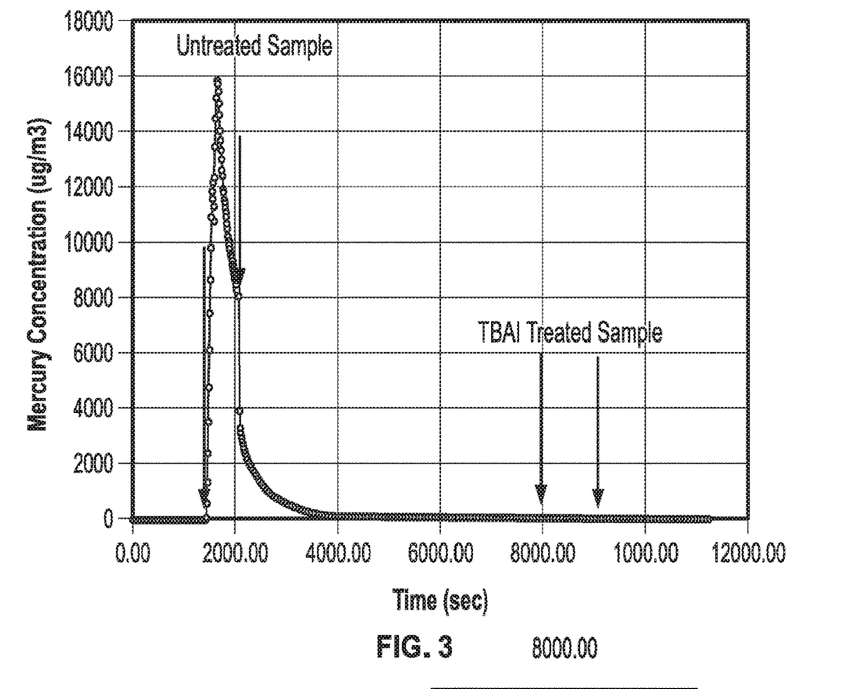
FIG. 3 depicts mercury emissions from a sorbent polymer composite before and after treatment with another exemplary halogen source.

A 10 mm×150 mm strip of the HgI$_2$ treated sample of Example 5 (0.79 g) was placed in a 1 cm×1 cm square sample holder at 60° C. A stable baseline was established bypassing the sample with 1 slpm of air (humidified to >80%). The effluent was passed through a SnCl$_2$/sulfuric acid trap chilled to 0° C. and then to the mercury analyzer (Ohio Lumex) The humid air was then directed through the sample. At this point, a very large emission (approximately 16,000 μg/m$^3$) of mercury was observed, as shown in FIG. 3. When the sample was again bypassed, the mercury level eventually returned to baseline. This large mercury emission is attributed to the vapor pressure of mercuric iodide above the sample.

The sample was removed from the holder, and soaked in a 0.74 wt % solution of TBAI in methanol for 15 minutes, then air dried and returned to the sample holder. When air was diverted through the sample, no mercury emission was detected. This showed that treatment with TBAI effectively mitigated any emission of mercury vapor. Following the test, the sample was again tested for HgI$_2$ content by X-ray Fluorescence and found to contain ~1 wt % Hg showing that no significant amount of HgI$_2$ was lost from the sample due to soaking. The sensitivity of this test, run at 1 slpm, is <0.0013 μHg vapor/min/g sample.

Example 8

Detection of Mercury Halide Complexes in Treated Sorbent Polymer Composite (SPC) Materials Formation of complexes with mercury halides occurs through the following equations 1 and 2.

$$HgX_2 + X^- \rightarrow HgX_3^-  \quad \text{(equation 1)}$$

$$HgX_3^- + X^- \rightarrow HgX_4^{2-} \quad \text{(equation 2)}$$

Where X is chloride (Cl$^-$), bromide (Br$^-$), and iodide (I$^-$).

The propensity to form complexes increase in the order I$^-$>Br$^-$>Cl$^-$.

The reactions are generally independent of the cation, which balances the charge of on the complex anions, however the cation can influence the solubility of the complexes. For example, a compound of a complexed potassium cation, such as K$_2$HgI$_4$, may be soluble in water, whereas a compound of a complexed tetrabutylammonium ([Bu$_4$N]$^+$) cation, such as (Bu$_4$N)$_2$HgI$_4$, may be insoluble in water. Herein and hereinafter, "Bu" refers to a butyl group.

Overview of XANES

XANES analysis is an acronym for x-ray absorption near edge spectroscopy. A sample is subjected to high energy X-rays (generally from a Synchrotron). The X-ray absorbance is measured as a function of X-ray energy. The position and shape of the near edge absorption provides information about the oxidation state of an element. The position and shape can also be used as a finger print to identify unknowns if suitable standards are provided.

Synthesis of (Bu$_4$N)HgI$_3$ (1:1 Complex)

(Bu$_4$N)HgI$_3$ was synthesized to provide a standard for XANES work.

0.3716 g (1 mmol) of TBAI was dissolved in 75 mL of methanol. 0.4522 g (1 mmol) of HgI$_2$ was added. The HgI$_2$ dissolved within a few minutes, yielding a pale yellow color solution. The solution was stirred for 30 minutes. The solution was allowed to evaporate in a crystallization dish to dryness. 0.69 grams of neon yellow, needle-like crystals were obtained (Sample 1).

The synthesis was repeated using 0.3686 grams of TBAI and 0.454 grams of HgI$_2$ in 75 mL of methanol. On evaporation, 0.75 grams of neon yellow crystals were collected (Sample 2).

Elemental analysis of Samples 1 and 2 was performed by Galbraith Laboratories Inc.® of Knoxville TN The results are shown below in Table 8.

TABLE 8

| Elemental Analysis of 1:1 complex | | | |
|---|---|---|---|
| (n-Bu$_4$N)[HgI$_3$] | Theoretical | Sample 1 | Sample 2 |
| Carbon | 23.40 | 23.72 | 23.61 |
| Hydrogen | 4.39 | 4.34 | 4.30 |
| Nitrogen | 1.71 | 1.69 | 1.66 |
| Mercury | 24.44 | 24.5 | 23.8 |
| Iodine | 46.06 | 45.42 | 45.7 |
| Sum | 100.00 | 99.67 | 99.07 |
| Melting Point | 126-128° C. | 126.1° C.-126.4° C. | 125.7° C.-126.7° C. |

As shown, the elemental analysis results correlated with the theoretical value for the 1:1 complex. Further the melting points obtained for Samples 1 and 2 correlated with the literature value obtained by Richard V. Snyder and Gerd N. La Mar, *J. Am. Chem. Soc.*, 98(15), 4419-4424 (1976). For comparison, the melting points of TBAI and HgI$_2$ are 141-143° C., and 259° C., respectively. The correlation between both elemental analysis and melting point are taken as evidence that Samples 1 and 2 included a mercury halide complex.

Reduced Volatility of (TGA) (Bu$_4$N)HgI$_3$ vs. HgI$_2$ and TBAI

Thermogravimetric analysis was performed on HgI$_2$ and on Sample 1. The thermal gravimetric analysis was performed by elevating the sample temperature slowly from ambient to 800° C. while measuring mass loss under an air atmosphere using TA Instruments Hi-Res Dynamic Method, respectively, using a TGA V5000 thermogravimetric analyzer made by TA Instruments. The first derivative of the mass loss vs. time provides a measure of the temperature in which the rate of vaporization reaches a maximum. For HgI$_2$, this peak was observed at 159° C. For (Bu$_4$N)HgI$_3$ the peak was at 258° C. From this analysis, it was evident that the mercury halide complex in question is less volatile than HgI$_2$.

Preparation of XANES Samples

The mercury compounds (HgI$_2$ and (Bu$_4$N)HgI$_3$), which were used as reference samples were mixed with PTFE powder in a ratio of 1:1 before loading in Kapton tubes.

A Sorbent Polymer Composite ("SPC") as generally described in U.S. Pat. No. 9,827,551 and containing oxidized mercury, was also recovered, in the form of a used SPC sample, after extended field exposure in the flue gas of a coal fired power plant and dried at 120° C.

All of the samples were cut in 1 mm diameter and loaded in the Kapton tubes by pushing each sample with a wire. All the samples were loaded until they contained 1 to 2 cm of each sample in the respective Kapton tube and the ends were secured with modeling clay.

Experimental Details of the XANES Experiment

XANES analysis was performed at the National Synchrotron Light Source at Brookhaven National Laboratories. The X-ray spectrum of the Hg L$_{111}$ edge was obtained for both the reference samples and the field exposed used SPC sample. As mentioned above, the field exposed used SPC sample was obtained following extended exposure to the flue gas of coal-fired power plants. The mercury content of those samples was relatively low (due to the relatively low concentration of mercury in the flue gas).

Graph of XANES of HgI$_2$, (Bu$_4$N)HgI$_3$

Figure 4:
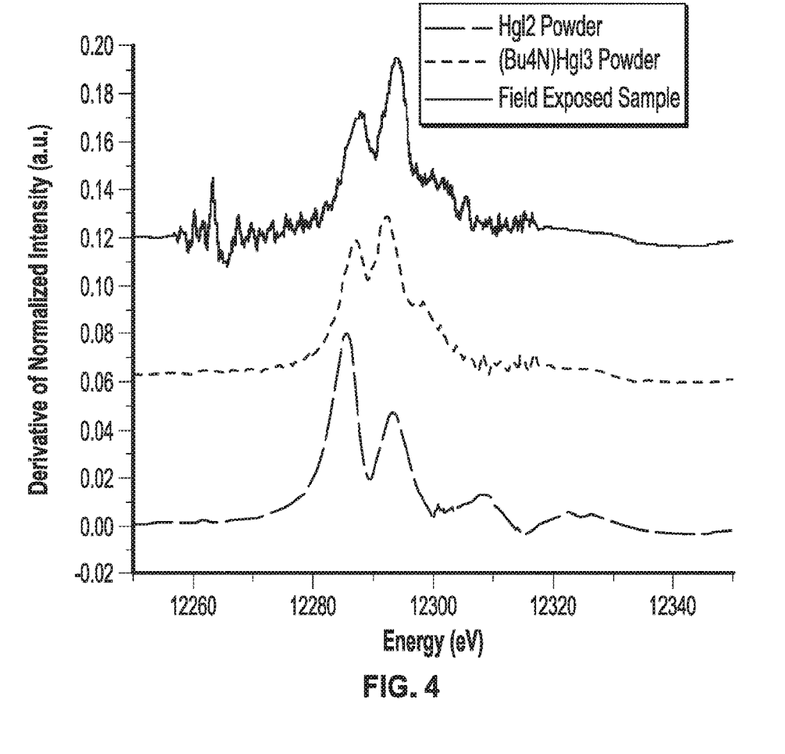
FIG. 4 shows derivatives of the Hg $L_{111}$ XANES spectra for $HgI_2$, $(Bu_4N)HgI_3$ and a field exposed sorbent polymer composite sample.

FIG. 4 shows derivatives of the Hg L$_{111}$ XANES spectra for HgI$_2$, (Bu$_4$N)HgI$_3$ and the field exposed SPC sample.

Specifically, the field exposed sample mentioned above (see, "Preparation of XANES samples"), was a used sorbent polymer composite (SPC) material, that was prepared using the general dry blending methodology taught in U.S. Pat. No. 7,791,861 to form composite samples, which were then uniaxially expanded according to the teachings of U.S. Pat. No. 3,953,566 to Gore. The field exposed used SPC sample, comprised of 65 parts activated carbon, 20 parts PTFE and 10 parts of a halogen source in the form of TBAI, and had been exposed to the effluent of a commercial lignite coal-fired power plant for several months and contained approximately 0.2 wt % Hg.

The HgI$_2$ standard was reagent grade (>99%) HgI$_2$ (Part number 221090) from Sigma Aldrich®.

The (Bu$_4$N)HgI$_3$ compound was prepared as described above.

Comparison of the derivatives spectra between the field exposed sample and the reference compounds (the HgI$_2$ and the (Bu$_4$N)HgI$_3$) was used to determine the position and separation of inflection points in the spectra. Any difference between the peaks and relative intensity of the field exposed used SPC sample as compared to the peaks and relative intensity of the (Bu$_4$N)HgI$_3$ was attributed to the relatively low concentration of mercury in the flue gas used to treat the field exposed used SPC sample.

As shown in FIG. 4, the peaks and relative intensity of the field exposed used SPC sample, were closer to those of (Bu$_4$N)HgI$_3$ than those of HgI$_2$, indicating the likely presence of a mercury halide complex in the field exposed used SPC material.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

The invention claimed is:

1. A method comprising:
   obtaining sorbent polymer composite material;
   wherein the sorbent polymer composite material comprises:
   a sorbent material; and
   a polymer material;
   contacting the sorbent polymer composite material with mercury vapor to form a used sorbent polymer composite material;
   wherein the used sorbent polymer composite material comprises oxidized mercury and
   wherein the used sorbent polymer composite material emits oxidized mercury vapor;
   contacting the used sorbent polymer composite material with a halogen source, so as to result in a treated sorbent polymer composite material;
   wherein the treated sorbent polymer composite material emits 0.01 μg to 0.10 μg less oxidized mercury vapor per minute per gram of the treated sorbent polymer composite, compared to the used sorbent polymer composite, when measured at 65° C. in air having 95% relative humidity.

2. The method of claim 1, further comprising repeating the step of contacting the used sorbent polymer composite material with the halogen source until the treated sorbent polymer composite material emits less than 0.01 μg mercury vapor per minute per gram of oxidized mercury when measured at 65° C. in air having 95% relative humidity.

3. The method of claim 1, wherein the used sorbent polymer composite material has a first mercury removal efficiency, wherein the treated sorbent polymer composite material has a second mercury removal efficiency, and wherein the second mercury removal efficiency is 10% to 100% greater than the first mercury removal efficiency.

4. The method of claim 3, further comprising the step of contacting the used sorbent polymer composite material with the halogen source until the treated sorbent polymer composite material has a second mercury removal efficiency that is more than double the first mercury removal efficiency.

5. The method of claim 1, wherein the treated sorbent polymer composite material comprises 0.1 wt % to 10 wt % of the halogen source based on the weight of the treated sorbent polymer composite material.

6. The method of claim 1, further comprising repeating contacting the used sorbent polymer composite material with the halogen source until the treated sorbent polymer composite material comprises 1 wt % to 5 wt % of the halogen source based on the weight of the treated sorbent polymer composite material.

7. The method of claim 1, wherein the polymer material is at least one of polytetrafluoroethylene (PTFE); polyfluoroethylene propylene (PFEP); polyperfluoroacrylate (PPFA); polyvinylidene fluoride (PVDF); a terpolymer of tetrafluoroethylene, hexafluoropropylene and vinylidene fluoride (THV); polychlorotrifluoroethylene (PCFE), and other copolymers or terpolymers containing at least one fluoromonomer with or without additional non-fluorinated monomers.

8. The method of claim 1, wherein the sorbent material is an activated carbon.

9. The method of claim 1, wherein the halogen source is an alkali metal halide, an ammonium halide, a quaternary ammonium halide, or a combination thereof.

10. The method of claim 9, wherein the alkali metal halide is sodium chloride, potassium chloride, sodium bromide, potassium bromide, sodium iodide, potassium iodide, or a combination thereof.

11. The method of claim 9, wherein the quaternary ammonium halide is tetramethylammonium iodide, tetraethylammonium iodide, tetrapropylammonium iodide, tetrabutylammonium iodide, tetramethylammonium bromide, tetraethylammonium bromide, tetrapropylammonium bromide, tetrabutylammonium bromide, tetramethylammonium chloride, tetraethylammonium chloride, tetrapropylammonium chloride, tetrabutylammonium chloride, ammonium chloride, ammonium bromide, or any combination thereof.

12. The method of claim 1, wherein the step of contacting the used sorbent polymer composite material with a halogen source comprises spraying a solution comprising the halogen source on the used sorbent polymer composite material.

13. The method of claim 12, wherein the solution comprises 0.01 wt % to 10 wt % of the halogen source based on the weight of the sorbent polymer composite material or the spent sorbent polymer composite material.

14. The method of claim 12, wherein the solution is an aqueous solution.

15. The method of claim 12, wherein the solution is a non-aqueous solution.

16. The method of claim 15 wherein the non-aqueous solution comprises alcohol.

17. The method of claim 16 wherein the alcohol comprises one or more of methanol, ethanol, or isopropanol.

18. The method of claim 16, wherein the surfactant is a non-ionic surfactant.

19. The method of claim 12, wherein the solution further comprises a surfactant.

20. The method of claim 19, wherein the solution comprises 0.001 wt % to 0.1 wt % of the surfactant based on the weight of the solution.

21. The method of claim 12, wherein the solution comprises a co-solvent.

22. The method of claim 12, wherein the solution comprises 10 wt % to 50 wt % of the co-solvent based on the weight of the solution.

23. The method of claim 1, wherein the step of contacting the used sorbent polymer composite material with a halogen source comprises soaking the used sorbent polymer composite material in a solution comprising the halogen source.

24. The method of claim 1, wherein the oxidized mercury comprises mercury halides.

25. The method of claim 1, wherein the treated sorbent polymer composite material comprises complexes of: (i) oxidized mercury and (ii) the halogen source.

26. A treated sorbent polymer composite material comprising:
   a sorbent material;
   a polymer material; and
   a chemical complex comprising:
      oxidized mercury; and
      a halogen source;
   wherein the treated sorbent polymer composite material emits 0.01 µg to 0.10 µg less oxidized mercury vapor per minute per gram of the treated sorbent polymer composite, compared to a used sorbent polymer composite, when measured at 65° C. in air having at 95% relative humidity;
   wherein the used sorbent polymer composite is identical to the treated sorbent polymer composite except that:
      the used sorbent polymer composite does not include a halogen source; and
      the oxidized mercury of the used sorbent polymer composite is not present in a complex with a halogen source.

27. The treated sorbent polymer composite of claim 26, wherein the chemical complex has the formula $HgX_4^{2-}$, wherein X is chloride (Cl–), bromide (Br–), or iodide (I–).

28. The treated sorbent polymer composite of claim 26, wherein the chemical complex has the formula $HgX_3^{-}$, wherein X is chloride (Cl–), bromide (Br–), or iodide (I–).

29. The treated sorbent polymer composite material of claim 26, wherein the chemical complex is integrated into a matrix of the treated sorbent polymer composite.

* * * * *